(12) United States Patent
Kuroishi et al.

(10) Patent No.: US 10,268,425 B2
(45) Date of Patent: Apr. 23, 2019

(54) SYSTEM, PROCESSING APPARATUS, AND IMAGE FORMING APPARATUS

(71) Applicant: FUJI XEROX CO., LTD., Tokyo (JP)

(72) Inventors: Kenji Kuroishi, Kanagawa (JP); Hiroshi Kubota, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/446,367

(22) Filed: Mar. 1, 2017

(65) Prior Publication Data

US 2018/0039457 A1 Feb. 8, 2018

(30) Foreign Application Priority Data

Aug. 2, 2016 (JP) .................. 2016-152299

(51) Int. Cl.
*G06F 15/00* (2006.01)
*G06F 3/12* (2006.01)
*H04N 1/00* (2006.01)

(52) U.S. Cl.
CPC .......... *G06F 3/1222* (2013.01); *G06F 3/1204* (2013.01); *G06F 3/1238* (2013.01); *G06F 3/1286* (2013.01); *G06F 3/1288* (2013.01); *H04N 1/00875* (2013.01)

(58) Field of Classification Search
CPC .... G06F 3/1286; G06F 3/1222; G06F 3/1204; G06F 3/1238; H04N 1/00875

USPC ........................................ 358/1.14
See application file for complete search history.

(56) References Cited

U.S. PATENT DOCUMENTS

| 8,775,929 B2* | 7/2014 | Kawamoto | H04N 1/4406 715/229 |
| 2009/0320127 A1* | 12/2009 | Hong | H04N 1/00846 726/21 |
| 2015/0092221 A1* | 4/2015 | Ochi | G06F 3/1222 358/1.14 |

FOREIGN PATENT DOCUMENTS

| JP | 2003-173365 A | 6/2003 |
| JP | 2006-325266 A | 11/2006 |
| JP | 2007-128234 A | 5/2007 |
| JP | 2014-041513 A | 3/2014 |
| JP | 2015-225444 A | 12/2015 |

* cited by examiner

*Primary Examiner* — Saeid Ebrahimi Dehkordy
(74) *Attorney, Agent, or Firm* — Oliff PLC

(57) ABSTRACT

A system includes a transmission apparatus that transmits data, and an output apparatus that outputs the received data. Output of the data is restricted if the output apparatus does not satisfy a predetermined security requirement. If a time period for outputting the data is specified, a confirmation is made with a recipient as to whether to permit removal of the restriction within the time period, and a response thereto is obtained. The output apparatus outputs the data if the response obtained from the recipient indicates removal of the restriction.

7 Claims, 14 Drawing Sheets

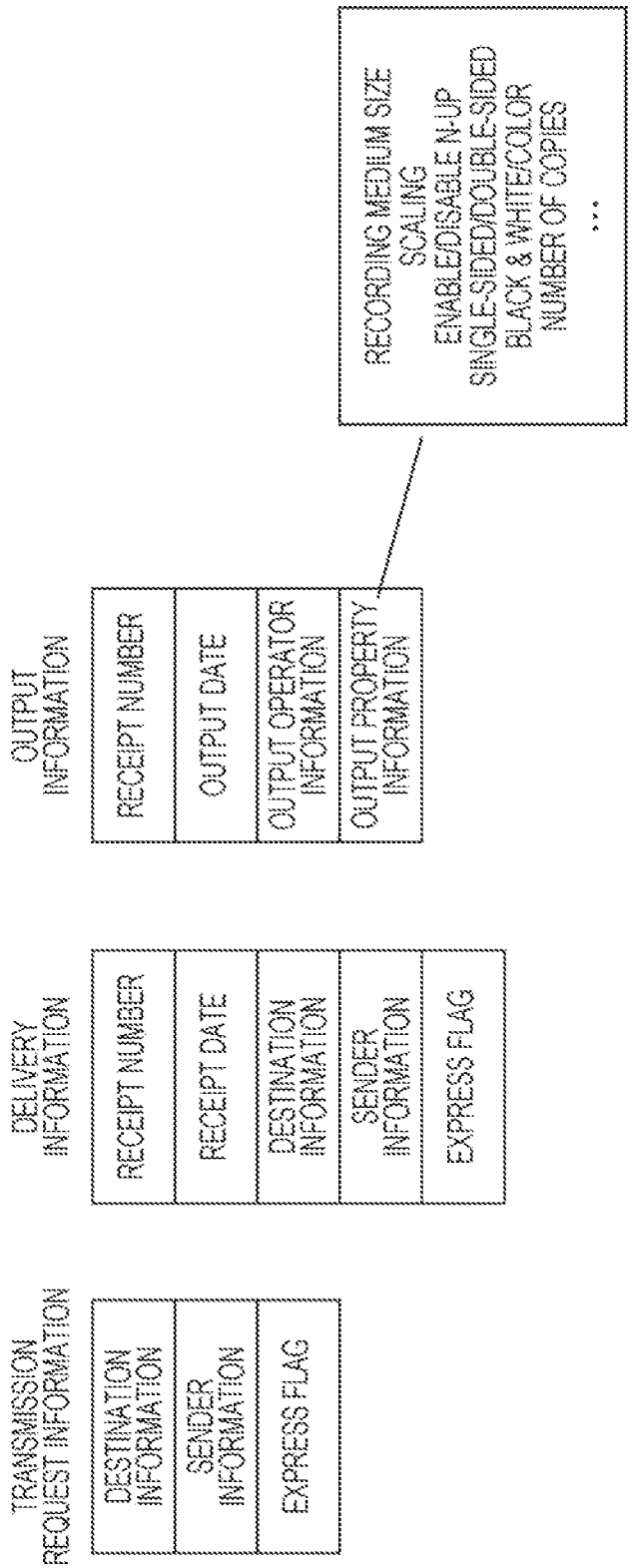

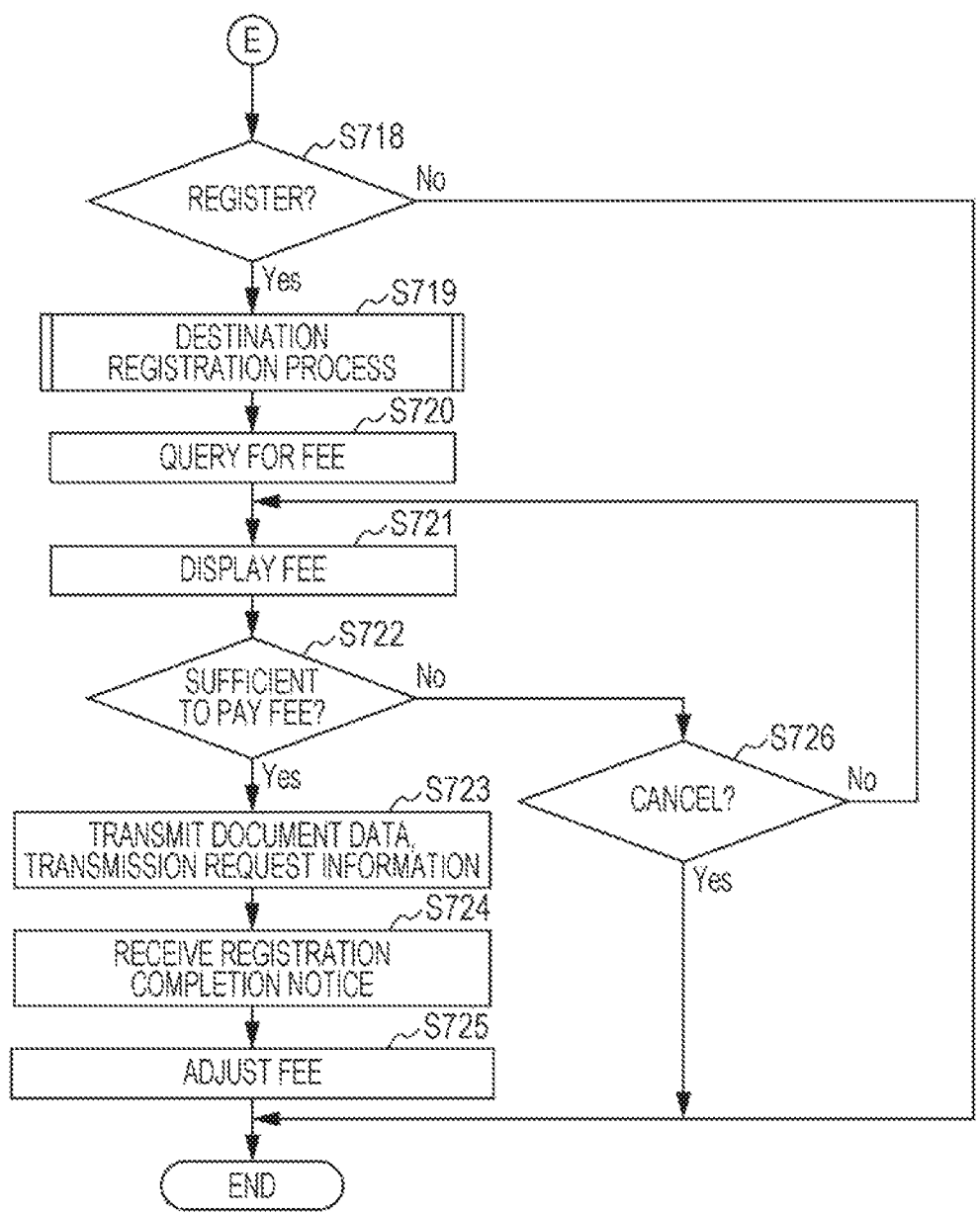

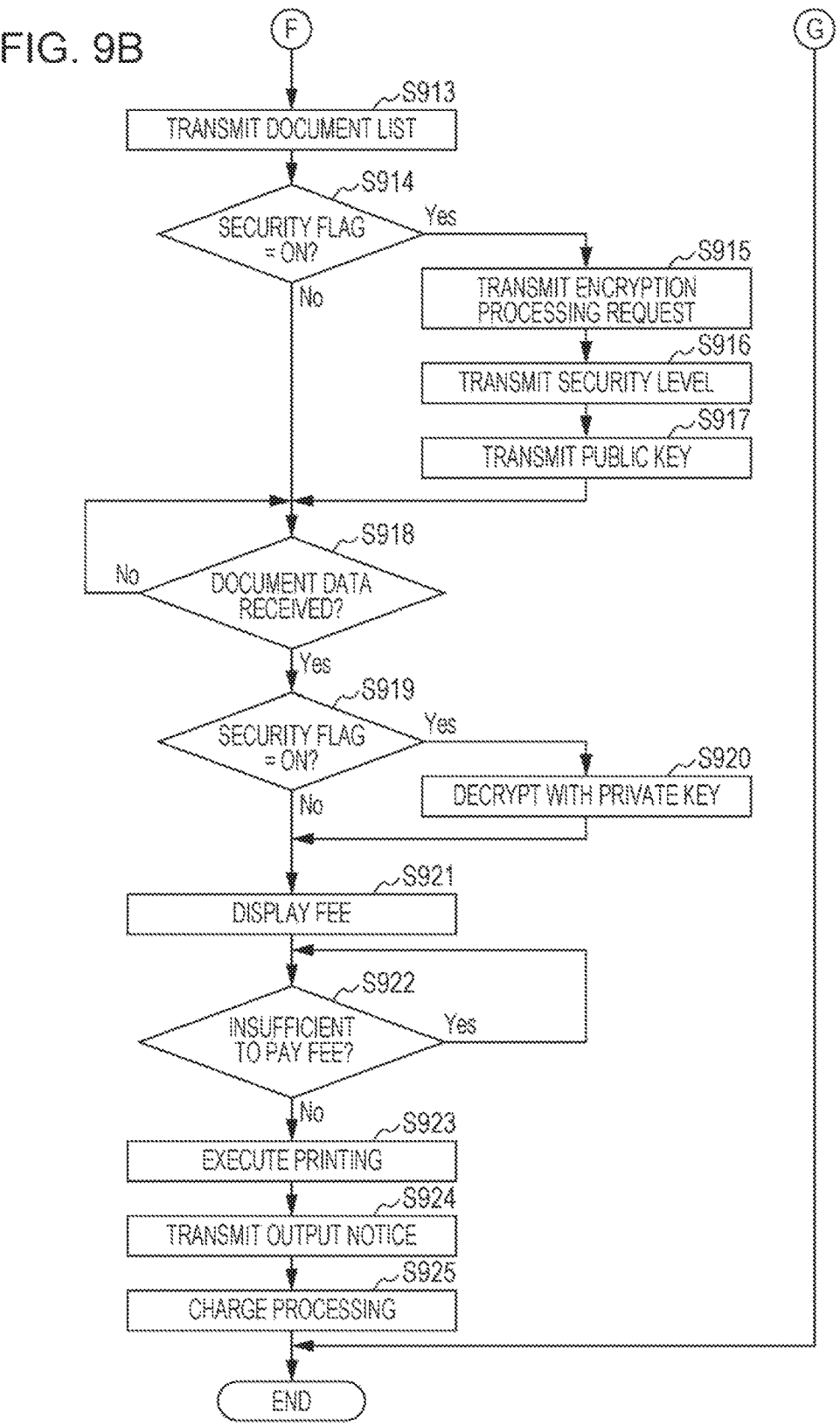

SYSTEM, PROCESSING APPARATUS, AND IMAGE FORMING APPARATUS

CROSS-REFERENCE TO RELATED APPLICATIONS

This application is based on and claims priority under 35 USC 119 from Japanese Patent Application No. 2016-152299 filed Aug. 2, 2016.

BACKGROUND

Technical Field

The present invention relates to a system, a processing apparatus, and an image forming apparatus.

SUMMARY

According to an aspect of the invention, there is provided a system including: a transmission apparatus that transmits data; and an output apparatus that outputs the received data; wherein output of the data is restricted if the output apparatus does not satisfy a predetermined security requirement; wherein if a time period for outputting the data is specified, a confirmation is made with a recipient as to whether to permit removal of the restriction within the time period, and a response thereto is obtained; and wherein the output apparatus outputs the data if the response obtained from the recipient indicates removal of the restriction.

BRIEF DESCRIPTION OF THE DRAWINGS

Exemplary embodiments of the present invention will be described in detail based on the following figures, wherein:

FIG. 6 illustrates information items contained in each of transmission request information, delivery information, and output information;

FIGS. 7A and 7B are flowcharts illustrating a transmission request process performed by the first image forming apparatus;

FIGS. 9A and 9B are flowcharts illustrating a printing (image forming) process performed by the second image forming apparatus;

DETAILED DESCRIPTION

First Exemplary Embodiment

Figure 1:
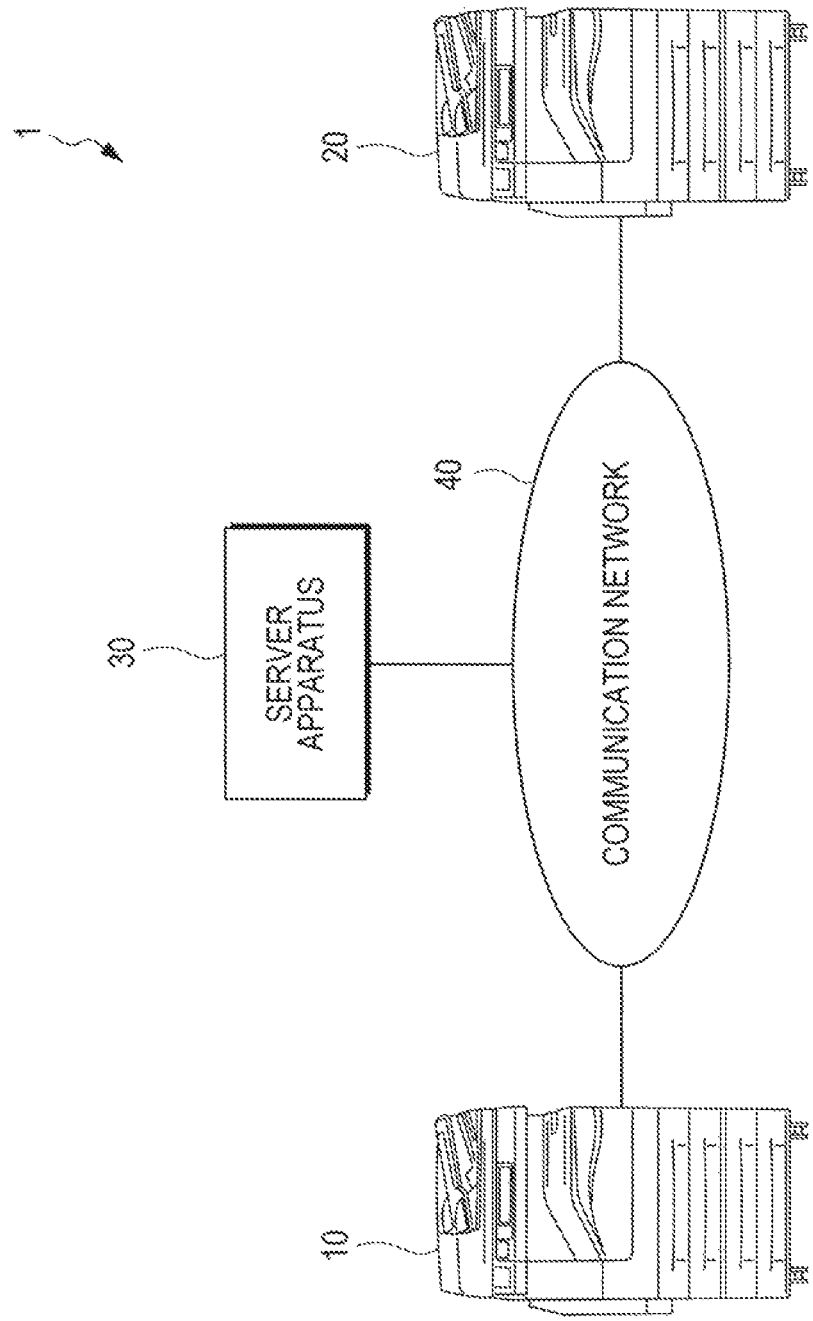
FIG. 1 illustrates a schematic configuration of a system according to a first exemplary embodiment.

FIG. 1 illustrates a schematic configuration of a system 1 according to a first exemplary embodiment of the present invention.

The system 1 includes a first image forming apparatus 10 and a second image forming apparatus 20, each having a function of copying a document, a function of generating image data of a read document, and a function of forming an image represented by image data on a recording medium such as paper.

The system 1 further includes a server apparatus 30 that provides services in response to requests from the first image forming apparatus 10 and the second image forming apparatus 20.

The first image forming apparatus 10, the second image forming apparatus 20, and the server apparatus 30 are connected to a communication network 40, which connects apparatuses to allow communication therebetween, and thus are able to communicate with each other via the communication network 40.

In this specification, the term "recording medium" refers to any medium on which an image can be formed, and the material thereof is not particularly limited. A typical example is paper, but the recording medium may be an OHP sheet, a metal sheet, or other types of media.

Figure 2:
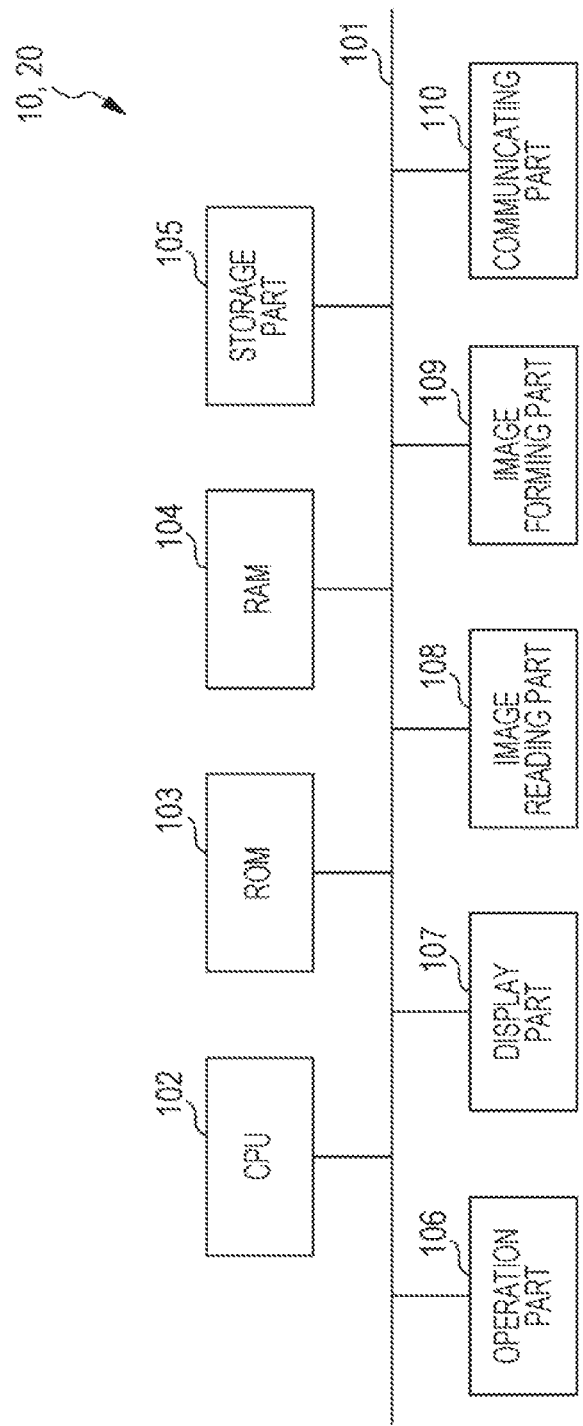
FIG. 2 is a block diagram illustrating the hardware configuration of a first image forming apparatus and a second image forming apparatus according to the first exemplary embodiment.

FIG. 2 is a block diagram illustrating the hardware configuration of the first image forming apparatus 10 and the second image forming apparatus 20 according to the first exemplary embodiment.

Each of the first image forming apparatus 10 and the second image forming apparatus 20 includes a central processing unit (CPU) 102, a read only memory (ROM) 103, a random access memory (RAM) 104, and a storage part 105, each connected to a bus 101. Each of the first image forming apparatus 10 and the second image forming apparatus 20 further includes an operation part 106, a display part 107, an image reading part 108, an image forming part 109, and a communicating part 110, each connected to the bus 101.

The ROM 103 stores a control program executed by the CPU 102. The CPU 102 reads the control program stored in the ROM 103, and executes the control program using the RAM 104 as a work area. When the control program is executed by the CPU 102, each of the parts of the first image forming apparatus 10 and the second image forming apparatus 20 is controlled by the CPU 102. Then, the first image forming apparatus 10 and the second image forming apparatus 20 can, for example, form an image on a recording medium, read a document to generate image data of the document, and communicate with other apparatuses via the communication network 40.

The storage part 105 includes a storage device, and stores data received by the communicating part 110, and data generated by the first image forming apparatus 10 and the second image forming apparatus 20, for example.

The operation part 106 includes plural operation units for receiving user operations. The operation units may include a hardware key, or may include a touch panel that is displayed on the display part 107 and outputs a control signal corresponding to a pressed position.

The display part 107 is a display device having a liquid crystal display, for example. The display part 107 displays a menu screen for operating the first image forming apparatus 10 or the second image forming apparatus 20, and data on the first image forming apparatus 10 or the second image forming apparatus 20, under the control of the CPU 102.

The image reading part 108 includes a platen glass (not illustrated), a light irradiating unit (not illustrated), a light guide unit (not illustrated), and an imaging lens (not illustrated). The light irradiating unit irradiates, with light, a surface (image surface) of a document to be read. The light guide unit guides the light that is emitted to the surface of the document to be read and is reflected from the surface of the document to be read. The imaging lens forms an optical image of the light guided by the light guide unit. The image reading part 108 further includes a detecting part (not illustrated) and an image processing part (not illustrated). The detecting part detects the formed optical image, and includes a photoelectric conversion element such as a Charge Coupled Device (CCD) image sensor that photoelectrically converts the optical image formed by the imaging lens. The image processing part is electrically connected to the detecting part, and receives an electric signal obtained by the detecting part.

The image reading part 108 reads an image of a document transported by a document transport part, and an image of a document placed on the platen glass.

The image forming part 109 includes four image forming units (not illustrated) of yellow, magenta, cyan, and block that are arranged in parallel at regular intervals. Each of the image forming units includes a photoconductor drum (not illustrated), a charging device (not illustrated) that uniformly charges the surface of the photoconductor drum, a developing device (not illustrated) that develops a visible image with toner, and a toner cartridge (not illustrated) for supplying toner of the corresponding color to the developing device.

The image forming part 109 further includes an optical system unit (not illustrated) that irradiates the photoconductor drums with laser light, and an intermediate transfer unit (not illustrated) that transfers and superimposes toner images of different colors formed on the photoconductor drums onto an intermediate transfer belt (not illustrated). The image forming part 109 further includes a second transfer unit (not illustrated) that transfers the superimposed toner images formed on the intermediate transfer unit to a recording medium, and a fixing device (not illustrated) that fixes a toner image formed on the recording medium by applying heat and pressure thereto.

The communicating part 110 is connected to the communication network 40, and servers as a communication interface (communication I/F) that communicates with other apparatuses connected to the communication network 40.

Figure 3:
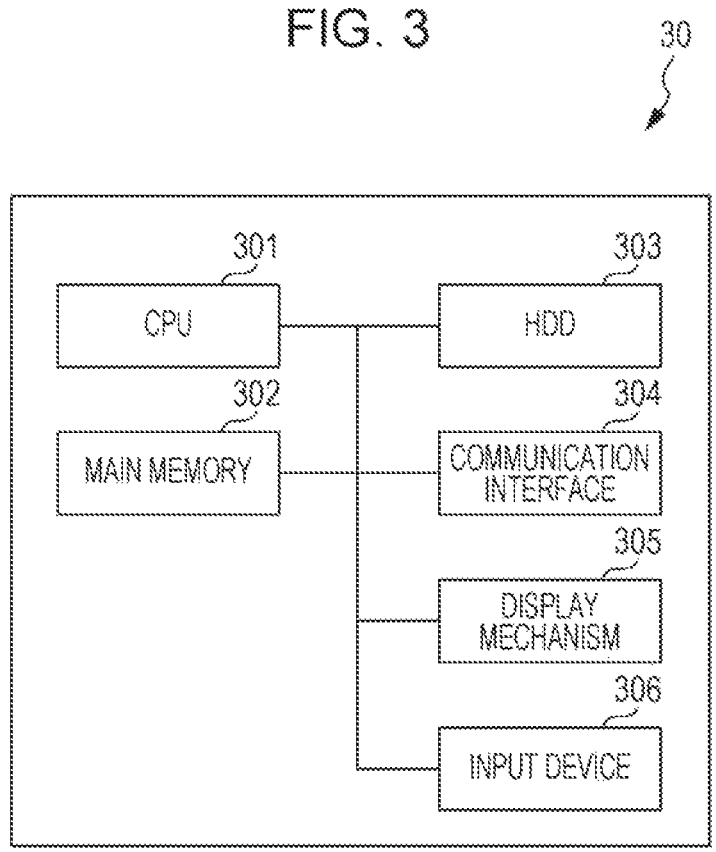
FIG. 3 is a block diagram illustrating the hardware configuration of a server apparatus according to the first exemplary embodiment.

FIG. 3 is a block diagram illustrating the hardware configuration of the server apparatus 30 according to the first exemplary embodiment.

As illustrated in FIG. 3, the server apparatus 30 includes a CPU 301, a main memory 302, and a hard disk drive (HDD) 303. The CPU 301 executes various types of software such as an operating system (OS) and applications. The main memory 302 is a storage area that stores various types of software and data used for execution thereof. The HDD 303 is a storage area that stores data input to various types of software and data output from various types of software.

The server apparatus 30 further includes a communication interface (communication I/F) 304 for communicating with external apparatuses, a display mechanism 305 including a video memory and a display, and an input device 306 such as a keyboard and a mouse.

Note that each program that is executed by the CPU 301 may be supplied in the form of being stored in a computer readable recording medium such as a magnetic recording medium (magnetic tape, magnetic disk, and so on), an optical recording medium (optical disk and so on), a magneto-optical recording medium, and a semiconductor memory. Further, each program may be downloaded to the server apparatus 30, using a communication unit such as the Internet.

The server apparatus 30 according to the first exemplary embodiment may be, for example, a cloud print server. That is, the server apparatus 30 provides a cloud service (hereinafter referred to as a "cloud print service") that enables printing a document using the first image forming apparatus 10 and the second image forming apparatus 20 installed at home, in offices and public spaces. More specifically, the server apparatus 30 generates print instruction information that instructs one of the first image forming apparatus 10 and the second image forming apparatus 20 to print a document, upon receiving a request for generating print instruction information from the other one of the first image forming apparatus 10 and the second image forming apparatus 20. The server apparatus 30 stores the print instruction information until a query for the presence of the print instruction information is received from the one image forming apparatus. Then, upon receiving a query for the presence of the print instruction information from the one image forming apparatus, the server apparatus 30 generates document data in a format supported by the one image forming apparatus, and provides the document data to the one image forming apparatus. The document data is provided to the one image forming apparatus by transmitting the print instruction information including the document data to the one image forming apparatus. Hereinafter, the term "print instruction information" refers to print instruction information including document data to be printed.

It is assumed that the first image forming apparatus 10 and the second image forming apparatus 20 are ready to receive print instruction information from the cloud print service. More specifically, the first image forming apparatus 10 and the second image forming apparatus 20 are registered in the cloud print service, while information on the cloud print service is set in the first image forming apparatus 10 and the second image forming apparatus 20.

In the following description, the term "print job" refers to a unit of processing executed by the first image forming apparatus 10 or the second image forming apparatus 20 based on print instruction information that indicates printing of document data. In this specification, print instruction information may also be referred to as a print job.

Further, in this specification, the term "document data" refers to electronic data from which an image to be recorded on a recording medium is created. The "document data" refers to not only electronic data of a "document" containing text, but also, for example, image data (which may be raster data or vector data) such as pictures, photos, and graphics, data recorded by database management software and spreadsheet software, and other printable electronic data.

Figure 4:
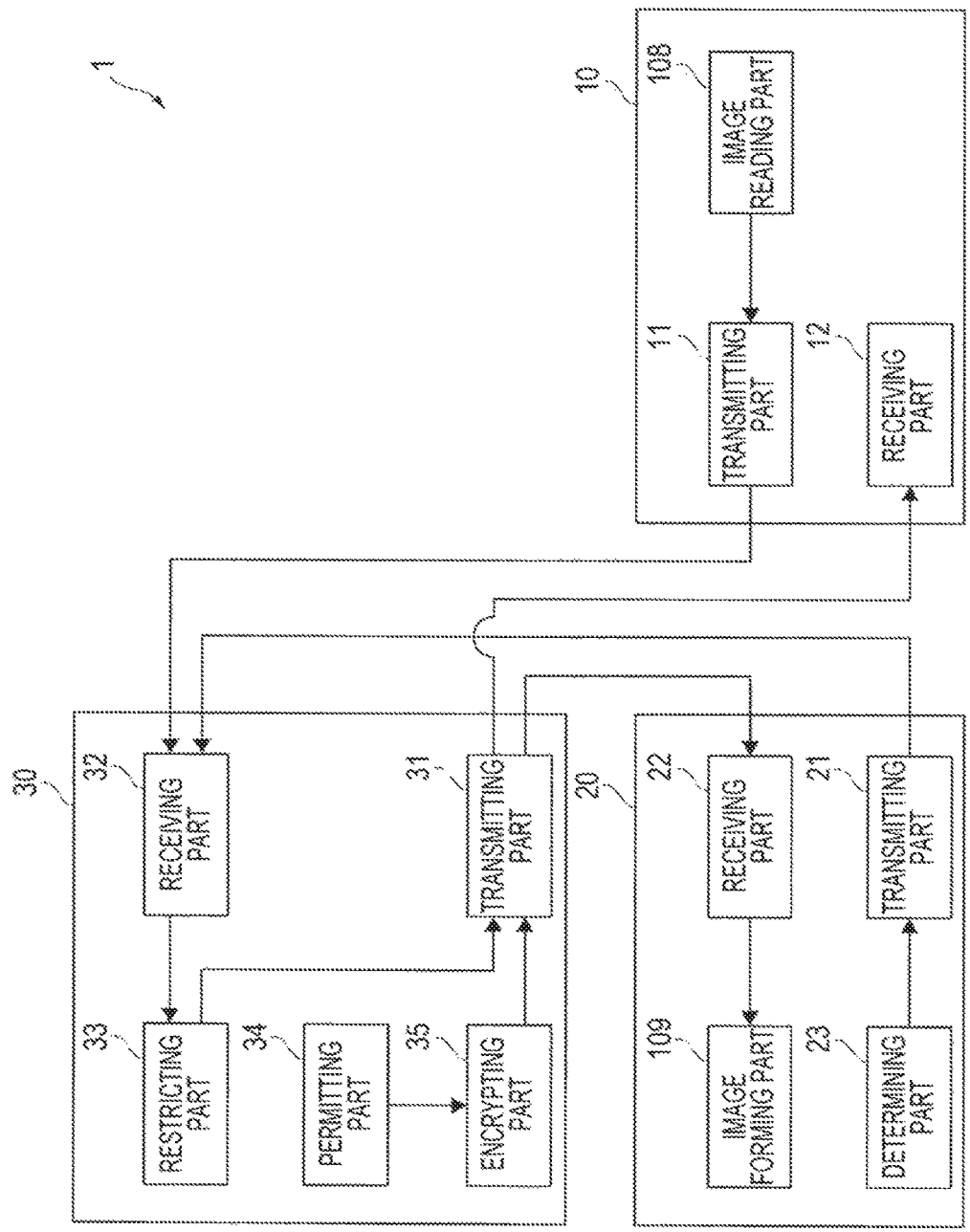
FIG. 4 is a block diagram illustrating the functional configuration of the system according to the first exemplary embodiment.

FIG. 4 is a block diagram illustrating the functional configuration of the system according to the first exemplary embodiment.

As illustrated in FIG. 4, the first image forming apparatus 10 and the second image forming apparatus 20 include transmitting parts 11 and 21 that transmit information to the server apparatus 30, and receiving parts 12 and 22 that receive a response and the like from the server apparatus 30 with respect to the information transmitted from the transmitting parts 11 and 21, respectively. The second image forming apparatus 20 includes a determining part 23 that determines whether a predetermined security requirement is satisfied.

As illustrated in FIG. 4, the server apparatus 30 includes a transmitting part 31 that transmits information such as document data to the first image forming apparatus 10 and the second image forming apparatus 20, and a receiving part 32 that receives a response and the like from the first image forming apparatus 10 and the second image forming apparatus 20 with respect to the information transmitted from the transmitting part 31. The server apparatus 30 further includes a restricting part 33 that restricts output of document data (formation (printing) of an image of document data on a recording medium), and a permitting part 34 that permits output of document data. The server apparatus 30 further includes an encrypting part 35 that encrypts document data.

The system 1 of the first exemplary embodiment having the configuration described above is used to transmit confidential correspondence as an example of a document. Confidential correspondence is a document that notifies a specific recipient of the will of the sender or a fact. Examples of confidential correspondence may include invoices and documents related thereto, meeting notices and documents related thereto, permissions and documents related thereto, certificates and documents related thereto, and direct mail. The invoices and documents related thereto include delivery cards, receipts, quotations, applications, and contracts. The meeting notices and documents related thereto include invitations for wedding and other events, and business reports. The permissions and documents related thereto include licenses, qualification certificates, and commendation certificates. The certificates and documents related thereto include seal registration certificates, tax payment certificates, copies of family registers, and copies of resident registers (note that the originals of family registers and the originals of resident registers are stored in city offices, and copies of family registers and copies of resident registers are issued by city offices). Direct mail and documents related thereto include documents with recipients indicated thereon.

The system 1 according to the first exemplary embodiment has a function that charges the sender of a document (document sender) when the sender transmits, among different types of confidential correspondence, a document (hereinafter referred to as an "express document") that needs to be obtained by the recipient of the document (document recipient) within a predetermined time period. Examples of express documents include direct mail. For instance, the express document may be direct mail with a coupon (discount coupon or the like) that offers some privileges to the document recipient and that is valid for a limited time only. Further, the express document may be an application for an entrance examination.

It is assumed that the document recipient is allowed to use the second image forming apparatus 20. More specifically, the document recipient is registered in the second image forming apparatus 20. Further, information indicating that the document recipient is an authorized user of the second image forming apparatus 20 is registered in the server apparatus 30. Thus, the document recipient can use the second image forming apparatus 20 when the document recipient logs in. In the case where a notice indicating that there is a document to be transmitted to the document recipient is received from the server apparatus 30, the notice may be provided to the document recipient by displaying on the display part 107.

The system 1 according to the first exemplary embodiment includes the server apparatus 30 as an example of a transmission apparatus that transmits document data, and the second image forming apparatus 20 as an example of an output apparatus that outputs received document data (forms (prints) an image of document data on a recording medium). Then, in the case where the second image forming apparatus 20 does not satisfy a predetermined security requirement, the system 1 restricts output of document data. Further, if a time period for outputting the document data is specified, the system 1 confirms with the document recipient whether the restriction may be removed within that time period, and obtains a response thereto. If the response obtained from the document recipient indicates removal of the restriction, the system 1 causes the second image forming apparatus 20 to output the document data.

The server apparatus 30 includes the restricting part 33 as an example of a restricting unit that restricts output of document data, the receiving part 32 as an example of an obtaining unit that confirms with the document recipient and obtains a response, and the permitting part 34 that permits the second image forming apparatus 20 to output the document data if the response obtained from the document recipient indicates removal of the restriction.

A predetermined security requirement is not satisfied if, for example, the second image forming apparatus 20 is installed in a public facility (for example, a convenience store). The second image forming apparatus 20 determines that a security requirement is not satisfied if an apparatus that charges the user (document recipient and the like) a fee is connected thereto, for example. Further, the second image forming apparatus 20 determines that a security requirement is not satisfied if a data security kit that provides "delete by overwriting" and "delete at once" functions for data stored in the storage part 105 is not applied. Further, the second image forming apparatus 20 determines that a security requirement is not satisfied if the second image forming apparatus 20 is in a mode dedicated for use in a public facility. Further, the second image forming apparatus 20 determines that a security requirement is not satisfied if information on installation locations is stored in the storage part 105 and if it is found from the stored installation location information that the second image forming apparatus 20 is installed in a public facility (for example, a convenience store). Further, the second image forming apparatus 20 determines that when a security requirement is not satisfied if a function is provided that enables use on a Wi-Fi network when an account is set up.

Figure 5A:
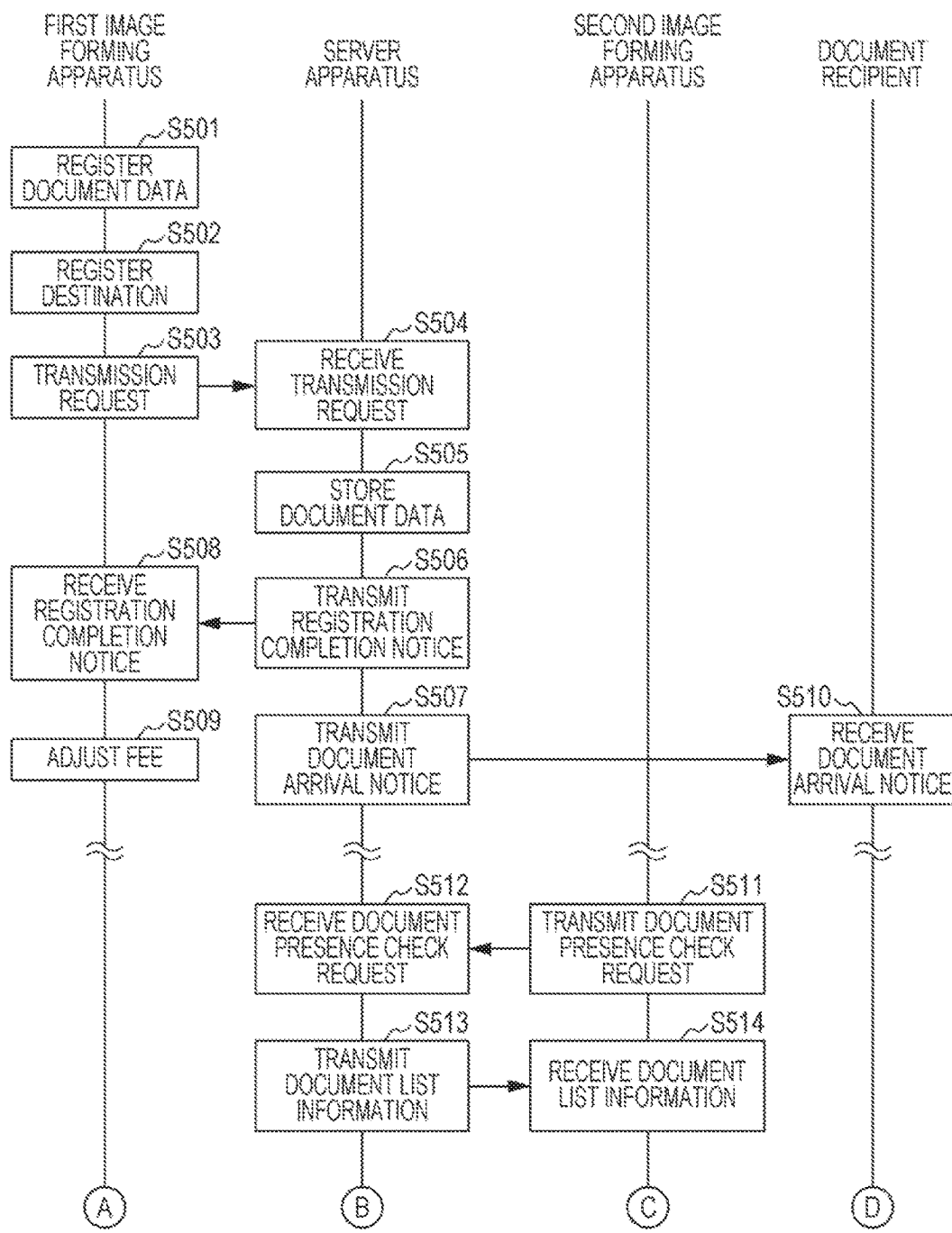
FIGS. 5A and 5B are sequence diagrams illustrating an exemplary operation in the system according to the first exemplary embodiment.
Figure 5B:
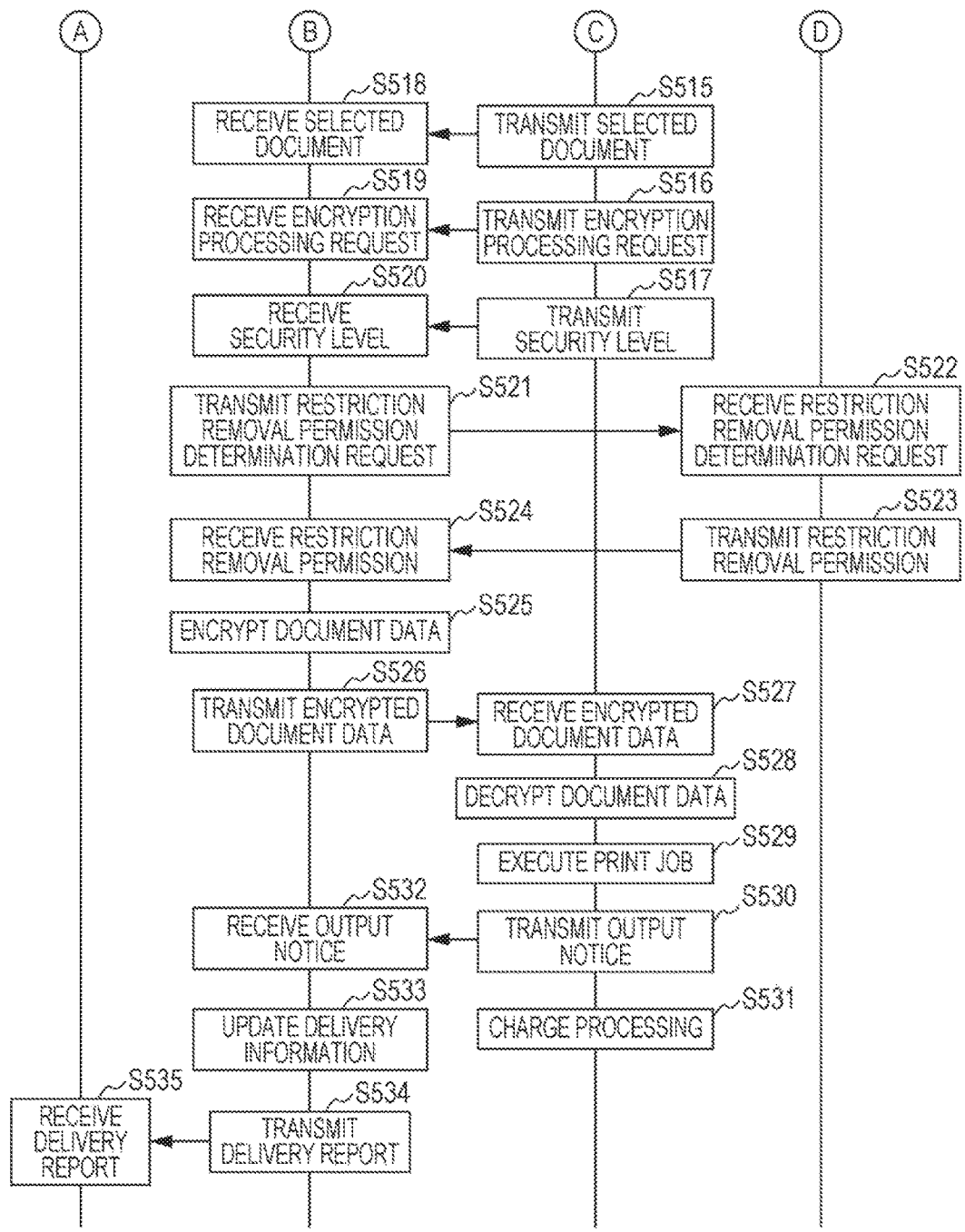

FIGS. 5A and 5B are sequence diagrams illustrating an exemplary operation in the system 1 according to the first exemplary embodiment. The exemplary operation illustrated in FIGS. 5A and 5B is one that is performed when a document sender transmits an express document via the first image forming apparatus 10 to a document recipient who uses the second image forming apparatus 20. Further, the exemplary operation illustrated in FIGS. 5A and 5B is one that is performed when the second image forming apparatus 20 does not satisfy a predetermined security requirement. Further, the exemplary operation illustrated in FIGS. 5A and 5B is one that is performed when a response indicating that a restriction may be removed is obtained from a document recipient.

FIG. 6 illustrates information items contained in each of transmission request information, delivery information, and output information.

Upon receiving a transmission instruction from a document sender, the first image forming apparatus 10 registers document data to be transmitted to a document recipient (S501). Further, the first image forming apparatus 10 registers the document recipient (destination) specified by the document sender (S502). Thereafter, the first image forming apparatus 10 transmits to the server apparatus 30 the document data to be transmitted to the document recipient and transmission request information, and makes a transmission request (S503). As illustrated in FIG. 6, the transmission request information includes destination information, sender information, and an express flag. The express flag is information indicating whether the document needs to be obtained by the document recipient within a predetermined time period. For example, the express flag is contained if the document needs to be obtained by the document recipient within a predetermined time period. The predetermined time period may be a time period from when the document sender issued a transmission instruction, or may be a time period from the first image forming apparatus 10 transmitted document data and the transmission request information to the server apparatus 30. Further, the predetermined time period may be set by the first image forming apparatus 10, or may be set by the document sender when issuing the transmission instruction.

The server apparatus 30 receives the transmission request transmitted from the first image forming apparatus 10 (S504), and stores the received document data and delivery information (S505). As illustrated in FIG. 6, the delivery information includes a receipt number, receipt date, destination information, sender information, and an express flag. Then, the server apparatus 30 transmits a registration completion notice indicating that the document data and the delivery instruction are registered in the first image forming apparatus 10 (S506). Further, the server apparatus 30 transmits by e-mail a document arrival notice indicating that the document addressed to the document recipient is received (S507). Note that second image forming apparatus 20 may transmit the document arrival notice to the document recipient, in response to a notice from the server apparatus 30.

The first image forming apparatus 10 receives the registration completion notice (S508), and then adjusts the fee (S509).

The document recipient receives the document arrival notice from the server apparatus 30 (S510).

In response to a request from the document recipient, the second image forming apparatus 20 transmits to the server apparatus 30 a document presence check request notice as a notice requesting to check whether there is a document addressed to the document recipient (S511).

The server apparatus 30 receives the document presence check request notice (S512), and then transmits information on a list of documents addressed to the document recipient to the second image forming apparatus 20 (S513).

The second image forming apparatus 20 receives the document list information transmitted from the server apparatus 30 (S514), and transmits information on documents selected by the document recipient and desired to be printed (output) to the server apparatus 30 (S515). Further, if there is a document with a high security level among the documents desired to be printed (output), the second image forming apparatus 20 transmits a notice requesting encryption processing (S516). Further, the second image forming apparatus 20 transmits information indicating the security level thereof (S517). More specifically, the determining part 23 of the second image forming apparatus 20 determines that the predetermined security requirement is not satisfied, and the transmitting part 21 transmits a notice indicating that the security level of the second image forming apparatus 20 is low (S517).

The server apparatus 30 receives information on the document desired to be printed (S518), receives the notice requesting encryption processing (S519), and receives the information indicating the security level of the second image forming apparatus 20 (S520).

The server apparatus 30 receives the notice indicating that the security level of the second image forming apparatus 20 is low (S520), and then transmits to the document recipient a notice requesting to determine whether an output (printing) restriction on the second image forming apparatus 20 may be removed (S521). The server apparatus 30 may transmit this notice to the document recipient, for example, by e-mail.

The document recipient receives the output (printing) restriction removal permission determination request notice from the server apparatus 30 (S522), and then transmits, in this exemplary operation, a response indicating that the output (printing) restriction on the second image forming apparatus 20 may be removed (S523).

The server apparatus 30 receives from the document recipient the response indicating that the output (printing) restriction may be removed (S524), encrypts the document data (S525), and transmits the encrypted document data to the second image forming apparatus 20 (S526).

The second image forming apparatus 20 receives the encrypted document data (S527), decrypts the document data (S528), and executes a print job (S529). That is, the second image forming apparatus 20 forms (prints) an image of the document data on a recording medium. Then, the second image forming apparatus 20 transmits to the server apparatus 30 a notice (output notice) indicating that the image has been formed (printed) and output, together with output information (S530). As illustrated in FIG. 6, the output information includes a receipt number, output date, output operator information, and output property information. The output property information includes information on the size of a recording medium, scaling, whether to print multiple pages per sheet (enable/disable N-Up), whether to print single-sided or double-sided, whether to print in black and white or in color, and the number of copies. Further, the second image forming apparatus 20 performs charging processing (S531).

The server apparatus 30 receives the output notice from the second image forming apparatus 20 (S532), and updates the delivery information (S533). In this example, the second image forming apparatus 20 stores information indicating that output (printing) has been performed by the second image forming apparatus 20 as part of the delivery information. Then, the server apparatus 30 transmits to the first image forming apparatus 10 a delivery report indicating that the document has been transmitted (S534), and the first image forming apparatus 10 receives the delivery report (S535). The first image forming apparatus 10 having received the delivery report may notify the document sender that the document has been delivered. The first image forming apparatus 10 may notify the document sender that the document has been delivered, by displaying on the display part 107, or may notify the document sender that the document has been delivered, by e-mail, for example.

The exemplary operation illustrated in FIGS. 5A and 5B is an example in which document data has been output (printed) by the second image forming apparatus 20. In the case where document data has not been output (not been output by the second image forming apparatus 20) within a predetermined time period, the server apparatus 30 notifies, as a delivery report, the first image forming apparatus 10 that document data has not been output. Then, the first image forming apparatus 10 having received the delivery report may notify the document sender that the document data has not been output, by displaying on the display part 107, or may notify the document sender that the document data has not been output, by e-mail, for example.

(Transmission Request Process Performed by First Image Forming Apparatus 10)

Figure 7A:
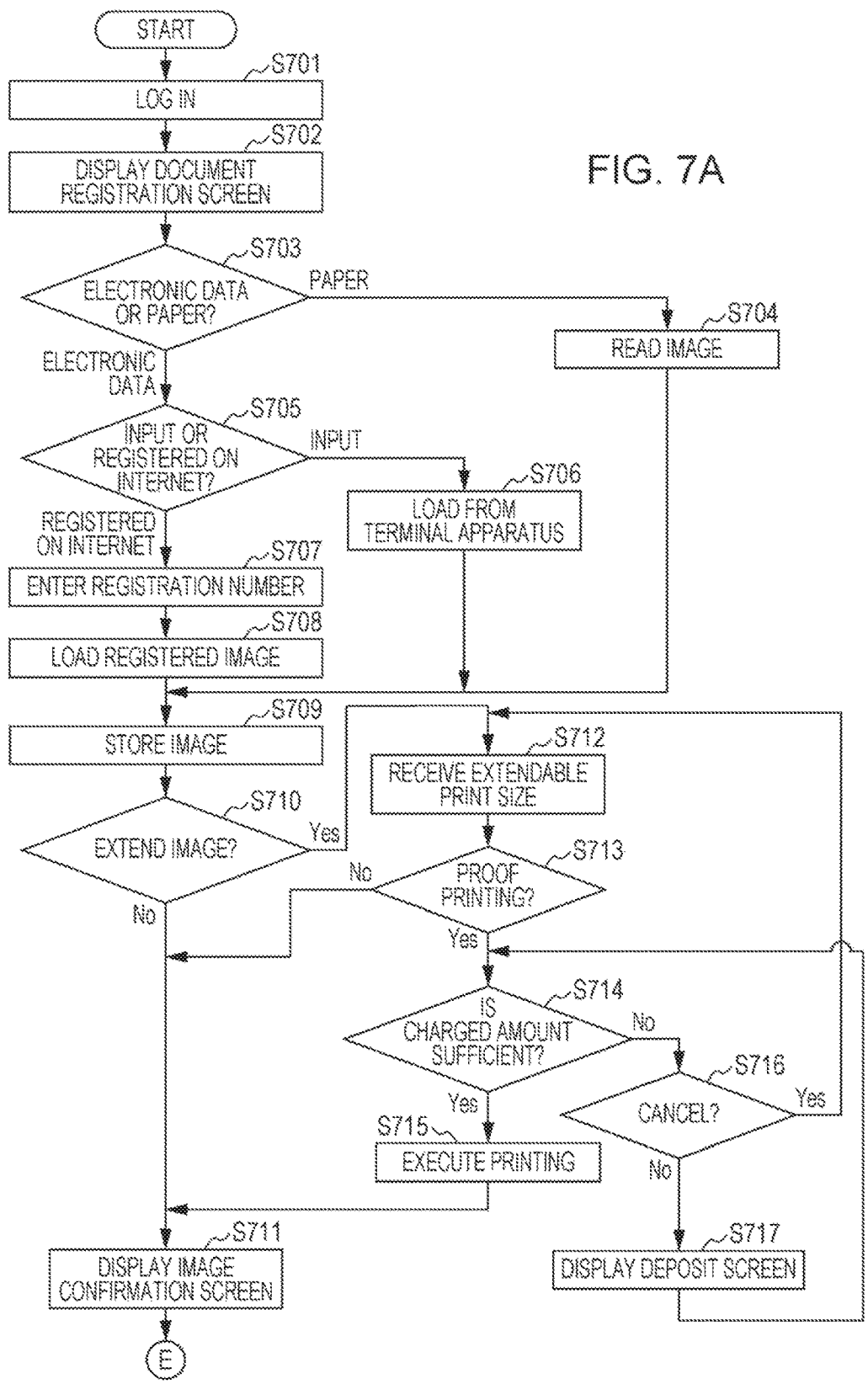

FIGS. 7A and 7B are flowcharts illustrating a transmission request process performed by the first image forming apparatus 10.

The first image forming apparatus 10 repeatedly executes a transmission request process at predetermined regular intervals (for example, at 10-millisecond intervals).

The first image forming apparatus 10 permits login of a document sender (S701) (in the case where the document sender is not registered (not stored in the server apparatus 30), newly registers the document sender). Then, in response to a request from the document sender, the first image forming apparatus 10 displays a screen for registering a document to be transmitted to the document recipient on the display part 107 (S702). Then, the first image forming apparatus 10 determines whether the document to be registered is electronic data or, for example, one recorded (formed) on paper (S703). For example, in the case where the document to be registered is one recorded (formed) on paper, the image reading unit 108 reads an image recorded (formed) on the paper (S704).

Meanwhile, in the case where the document to be registered is electronic data, the first image forming apparatus 10 determines whether the document to be registered is to be input using a terminal apparatus used by the document sender, or has already been registered on the Internet (S705). In the case where the document to be registered is to be input using a terminal apparatus, the first image forming apparatus 10 loads an image via the communication network 40 from the terminal apparatus that is connected to the communication network 40 (S706). In the case where the document to be read has already been registered on the Internet, the first image forming apparatus 10 prompts the document sender to enter a registration number (S707), and loads the registered image via the communication network 40 (S708).

Then, the first image forming apparatus 10 stores the loaded image (S709), and determines whether to extend the image (S710). In the case of not extending the image (No in step S710), the first image forming apparatus 10 displays a screen for confirming the image to be registered, on the display part 107 (S711). In the case of extending the image (Yes in S710), the first image forming apparatus 10 receives a designation of the extendable size (S712), and determines whether proof printing is instructed (S713). If proof printing is not instructed (No in S713), the first image forming apparatus 10 performs the operations in step S711 and the subsequent steps.

Meanwhile, if proof printing is instructed (Yes in S713), the first image forming apparatus 10 determines whether the charged amount is sufficient for proof printing (S714). If the charged amount is sufficient (Yes in S714), the first image forming apparatus 10 performs proof printing (S715). If the charged amount is not sufficient (No in S714), the first image forming apparatus 10 determines whether proof printing is cancelled (S716). If proof printing is not cancelled (No in S716), the first image forming apparatus 10 displays a deposit screen on the display part 107 (S717), and performs the operations in step S714 and the subsequent steps. If proof printing is cancelled (Yes in S716), the first image forming apparatus 10 performs the operations in step S712 and the subsequent steps.

In the operation of step S711, the first image forming apparatus 10 displays a screen for confirming the image to be registered on the display part 107, and then determines whether registration is instructed (S718). Then, if registration is instructed (Yes in S718), the first image forming apparatus 10 performs a destination registration process (described below) (S719). If registration is not instructed (No in S718), the transmission request process ends. In the operation of step S718, for example, the first image forming apparatus 10 displays a screen for confirming whether to perform registration, on the display part 107. Then, for example, if a display button for performing registration is pressed, the first image forming apparatus 10 may determine that registration is instructed and perform a destination registration process (S719). If a display button for rejecting registration is pressed, the transmission request process may end.

After a destination is registered in the destination registration process, the first image forming apparatus 10 queries the server apparatus 30 for the fee required to transmit the document (S720), and displays the fee received from the server apparatus 30 on the display part 107 (S721). Thereafter, the first image forming apparatus 10 determines whether the amount of money deposited by the document recipient is sufficient to pay the required fee (S722). If the deposited money is sufficient (Yes in S722), the first image forming apparatus 10 transmits to the server apparatus 30 document data of the registered image to be transmitted to the document recipient and a transmission request information (S723). The server apparatus 30 stores document data, transmission request information (destination information, sender information, an express flag, and so on), registers the document data and the transmission request information in association with each other in a destination folder, and transmits a notice indicating the completion of registration to the first image forming apparatus 10.

The first image forming apparatus 10 receives the registration completion notice from the server apparatus 30 (S724), and adjusts the fee (S725). Then, the transmission request process ends.

Meanwhile, if the deposited amount is not sufficient to pay the required fee (No in S722), the first image forming apparatus 10 determines whether registration is cancelled (for example, whether a cancel button displayed on the display part 107 is pressed) (S726). If registration is not cancelled (No in S726), the first image forming apparatus 10 performs the operations in step S721 and the subsequent steps. If registration is cancelled (Yes in S726), the transmission request process ends.

(Destination Registration Process Performed by First Image Forming Apparatus 10)

Figure 8:
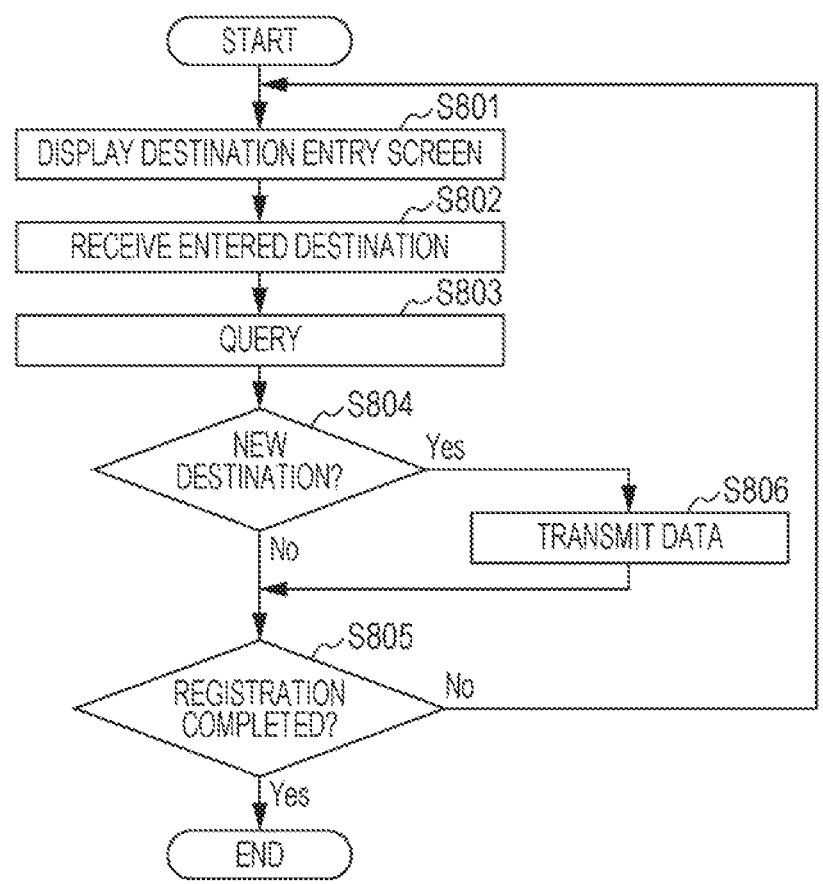
FIG. 8 is a flowchart illustrating a destination registration process performed by the first image forming apparatus.

FIG. 8 is a flowchart illustrating a destination registration process performed by the first image forming apparatus 10.

The first image forming apparatus 10 displays a screen for entering a destination, on the display part 107 (S801). The first image forming apparatus 10 receives the entered information on the destination and so on (S802), and queries the server apparatus 30 as to whether the user (document recipient) at the entered destination is registered (S803). Then, the first image forming apparatus 10 determines whether the entered destination is a new destination (S804). If the entered destination is not a new destination (No in S804), the first image forming apparatus 10 determines whether registration of the destination and so on is completed (S805). If the entered destination is a new destination (Yes in S804), the first image forming apparatus 10 transmits the entered information on the destination and so on to the server apparatus 30 (S806), prompts the server apparatus 30 to register a new user (document recipient), and performs the operations in step S805 and the subsequent steps. If destination registration is completed (Yes in S805), the destination registration process ends. Meanwhile, if destination registration is not completed (No in S805), the first image forming apparatus 10 performs the operations in step S801 and the subsequent steps. In the operation of step S805, for example, the first image forming apparatus 10 displays a screen for confirming whether to register the destination, on the display part 107. Then, for example, if a display button for performing registration is pressed, the first image forming apparatus 10 may determine that registration is instructed and complete the destination registration process. If a display button for rejecting registration is pressed, the first image forming apparatus 10 may perform the operations in step S801 and the subsequent steps.

(Printing (Image Forming) Process Performed by Second Image Forming Apparatus 20)

Figure 9A:
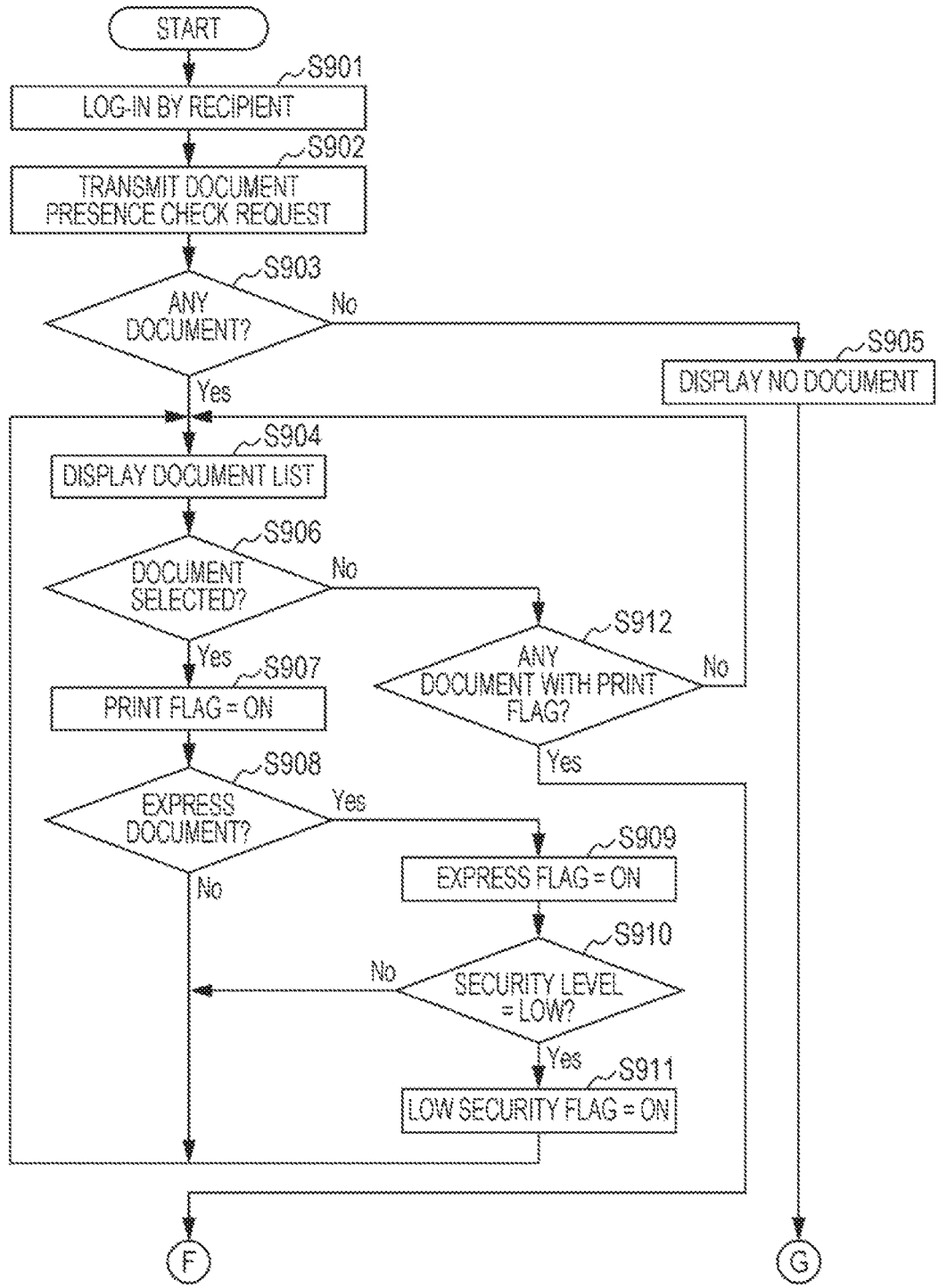

FIGS. 9A and 9B are flowcharts illustrating a printing (image forming) process performed by the second image forming apparatus 20.

The second image forming apparatus 20 repeatedly executes a printing (image forming) process at predetermined regular intervals (for example, at 10-millisecond intervals).

The second image forming apparatus 20 permits login of a document recipient (S901). Then, in response to a request from the document recipient, the second image forming apparatus 20 transmits to the server apparatus 30 a document presence check request notice as a notice requesting to check whether there is a document addressed to the document recipient (S902). Thereafter, the second image forming apparatus 20 refers to a response received from the server apparatus 30 (a response indicating that there is no document if there is no such document, and information on a list of documents addressed to the document recipient if there are such documents) (S903). Then, if there are such documents (Yes in S903), the second image forming apparatus 20 displays a list of documents, on the display part 107 (S904). If there is no such document (No in S903), the second image forming apparatus 20 displays information indicating that there is no document, on the display part 107 (S905).

The second image forming apparatus 20 displays the list of documents (S904), and then determines whether a document to be printed is selected by the document recipient (S906). If a document to be printed is selected (Yes in S906), a print flag is turned ON (S907). The print flag is information indicating whether a document is selected as a document to be printed, and is turned ON if the document is selected by a document recipient. Further, if a document is selected and then deselected, the print flag is turned OFF.

Thereafter, the second image forming apparatus 20 determines whether the selected document is an express document (S908). Information indicating whether a document is an express document is included in the document list information received from the server apparatus 30. Then, if the document is an express document (Yes in S908), an express flag is turned ON (S909). Thereafter, the second image forming apparatus 20 determines whether the security level of the selected document is low (S910). If the security level is low (Yes in S910), a low security flag is turned ON (S911). The low security flag is information indicating whether the security level of a document is low. The low security flag is turned ON if the security level is low, and is turned OFF if the security level is high. Note that if the security level is high, the security flag is turned ON. If the document is not an express document (No in S908), and if the security level is not low (No in S910), the second image forming apparatus 20 performs the operations in step S904 and the subsequent steps.

Meanwhile, if a document to be printed is not selected by the document recipient (No in S906), the second image forming apparatus 20 determines whether there is a document whose print flag is ON among the displayed list of documents (S912). If there is a document whose print flag is ON (Yes in S912), the second image forming apparatus 20 transmits to the server apparatus 30 a list of selected documents (S913).

The server apparatus 30 receives the list of selected documents, and then executes a document data transmission process (described below).

Thereafter, the second image forming apparatus 20 determines whether there is a document whose security flag is ON (S914). If there is a document whose security flag is ON (Yes in S914), the second image forming apparatus 20 transmits to the server apparatus 30 a notice requesting encryption processing (S915). Further, the second image forming apparatus 20 transmits information indicating the security level thereof (S916). Further, if a notice requesting a public key is received from the server apparatus 30, the second image forming apparatus 20 transmits a public key (S917).

Thereafter, the second image forming apparatus 20 determines whether document data of all the selected documents is received from the server apparatus 30 (S918). If the document data is received (Yes in S918), the second image forming apparatus 20 determines whether the security flag of any of the documents is ON (S919). As for the document whose security flag is ON, the second image forming apparatus 20 decrypts encrypted document data transmitted from the server apparatus 30, with a private key (S920).

Thereafter, the second image forming apparatus 20 displays on the display part 107 the fee for printing (output) (S921), and determines whether the deposited amount is insufficient to pay the fee (S922). If the deposited amount is not insufficient (No in S922), printing (output) is performed (S923). That is, the second image forming apparatus 20 forms (prints) an image of the document data on a recording medium. Then, the second image forming apparatus 20 transmits to the server apparatus 30 a notice (output notice) indicating that the image has been formed (printed) and output, together with output information (S924). Then, the second image forming apparatus 20 performs charging processing (S925).

(Document Data Transmission Process Performed by Server Apparatus 30)

Figure 10:
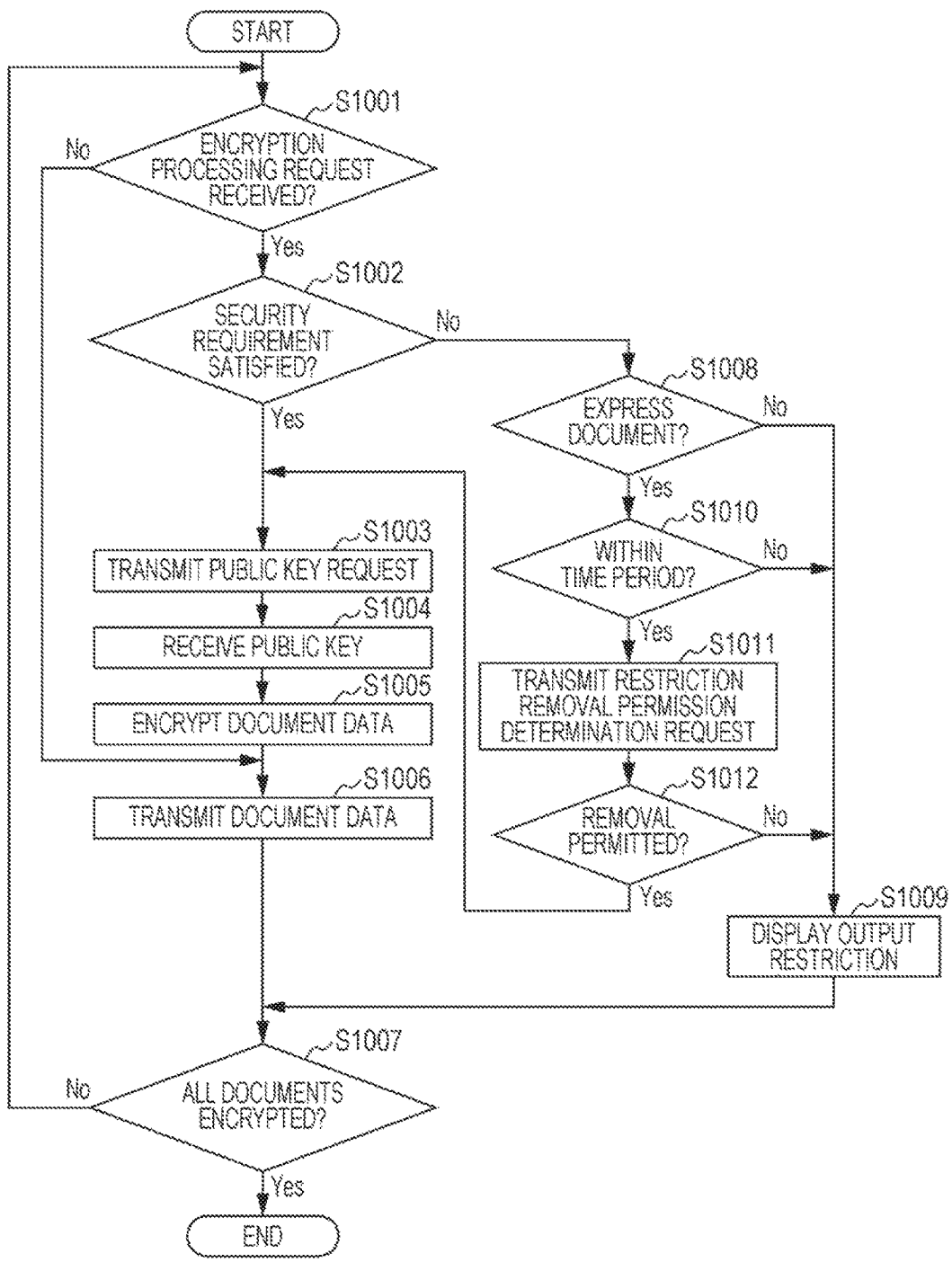
FIG. 10 is a flowchart illustrating a document data transmission process performed by the server apparatus.

FIG. 10 is a flowchart illustrating a document data transmission process performed by the server apparatus 30.

The server apparatus 30 executes a document data transmission process after receiving a list of selected documents from the second image forming apparatus 20.

The server apparatus 30 selects one document out of all the selected documents, and determines whether a notice for requesting encryption processing with respect to the one document is received from the second image forming apparatus 20 (S1001). If a notice for requesting encryption processing is received (Yes in S1001), the server apparatus 30 determines whether the security level of the second image forming apparatus 20 satisfies a predetermined security requirement (S1002). If the security requirement is satisfied (Yes in S1002), the encrypting part 35 encrypts the one document. That is, the encrypting part 35 first transmits to the second image forming apparatus 20 a public key request notice as a notice requesting a public key (S1003). Then, the encrypting part 35 receives a public key from the second image forming apparatus 20 (S1004), and encrypts document data of the one document with the obtained public key (S1005). Then, the transmitting part 31 transmits the encrypted document data to the second image forming apparatus 20 (S1006). Thereafter, the server apparatus 30 determines whether encryption processing is performed on all the selected documents (S1007). If encryption processing is performed on all the selected documents (Yes in S1007), this process ends. Meanwhile, if encryption processing is not performed on all the selected documents (No in S1007), the server apparatus 30 performs the operations in step S1001 and the subsequent steps.

Meanwhile, if the security requirement is not satisfied (No in S1002), the server apparatus 30 determines whether the one document is an express document (S1008). If the one document is not an express document (No in S1008), the server apparatus 30 transmits to the second image forming apparatus 20 a notice for causing the display part 107 of the second image forming apparatus 20 to display information indicating that output (printing) is restricted because the second image forming apparatus 20 does not satisfy the security requirement (S1009), and executes the operations in step S1007 and the subsequent steps. That is, the restricting part 33 of the server apparatus 30 restricts output (printing) by the second image forming apparatus 20 not satisfying the security requirement.

Meanwhile, if the one document is an express document (Yes in S1008), the server apparatus 30 determines whether it is with the predetermined time period (S1010). If it is within the predetermined time period (Yes in S1010), the server apparatus 30 transmits to the document recipient a notice requesting to determine whether an output (printing) restriction on the second image forming apparatus 20 may be removed (S1011). Then, the server apparatus 30 determines whether a response from the document recipient indicates permission of removal of the output (printing) restriction (S1012). This determination is made based on the response obtained by the receiving part 32 as an example of an obtaining unit that obtains a response from the document recipient.

If the response indicates permission of removal (Yes in S1012), the server apparatus 30 executes the operations in step S1003 and the subsequent steps. More specifically, the server apparatus 30 encrypts document data of the one document with a public key received from the second image forming apparatus 20 (S1005), and transmits the encrypted document data to the second image forming apparatus 20 (S1006). That is, if the response from the document recipient indicates permission of removal of the output (printing) restriction, the permitting part 34 of the server apparatus 30 removes the output (printing) restriction on the second image forming apparatus 20 and permits output (printing).

Meanwhile, if the response is not one that indicates permission of removal (No in S1012), the server apparatus 30 transmits to the second image forming apparatus 20 a notice for causing the display part 107 of the second image forming apparatus 20 to display information indicating that output (printing) is restricted because the second image forming apparatus 20 does not satisfy the security requirement (S1009), and executes the operations in step S1007 and the subsequent steps. Further, if it is not within the predetermined time period (No in S1010), the server apparatus 30 performs the operations in step S1009 and the subsequent steps.

In the system 1 of the first exemplary embodiment having the configuration described above, even when output (printing) is restricted because the second image forming apparatus 20 does not satisfy the predetermined security requirement, the output (printing) restriction is removed if a response indicating removal of the restriction is obtained from the document recipient. Accordingly, document data is output (printed) by the second image forming apparatus 20 not satisfying the security requirement. Since the output (printing) by the second image forming apparatus 20 is performed after obtaining permission from the document recipient, the document recipient is prevented from unexpectedly suffering from disadvantages. In the case where the recipient wishes to quickly receive a document because, for example, the document needs to be received within a predetermined time period, the recipient may prioritize obtaining the document quickly over security. In other words, the document recipient may avoid a situation in which the document recipient cannot receive a document that the document recipient wishes to receive quickly because the security requirement is not satisfied.

Second Exemplary Embodiment

A system 2 of a second exemplary embodiment is different from the system 1 of the first exemplary embodiment in that a second image forming apparatus 20 at the receiving end imposes and removes a document data output restriction.

The following describes the differences from the system 1 of the first exemplary embodiment.

Figure 11:
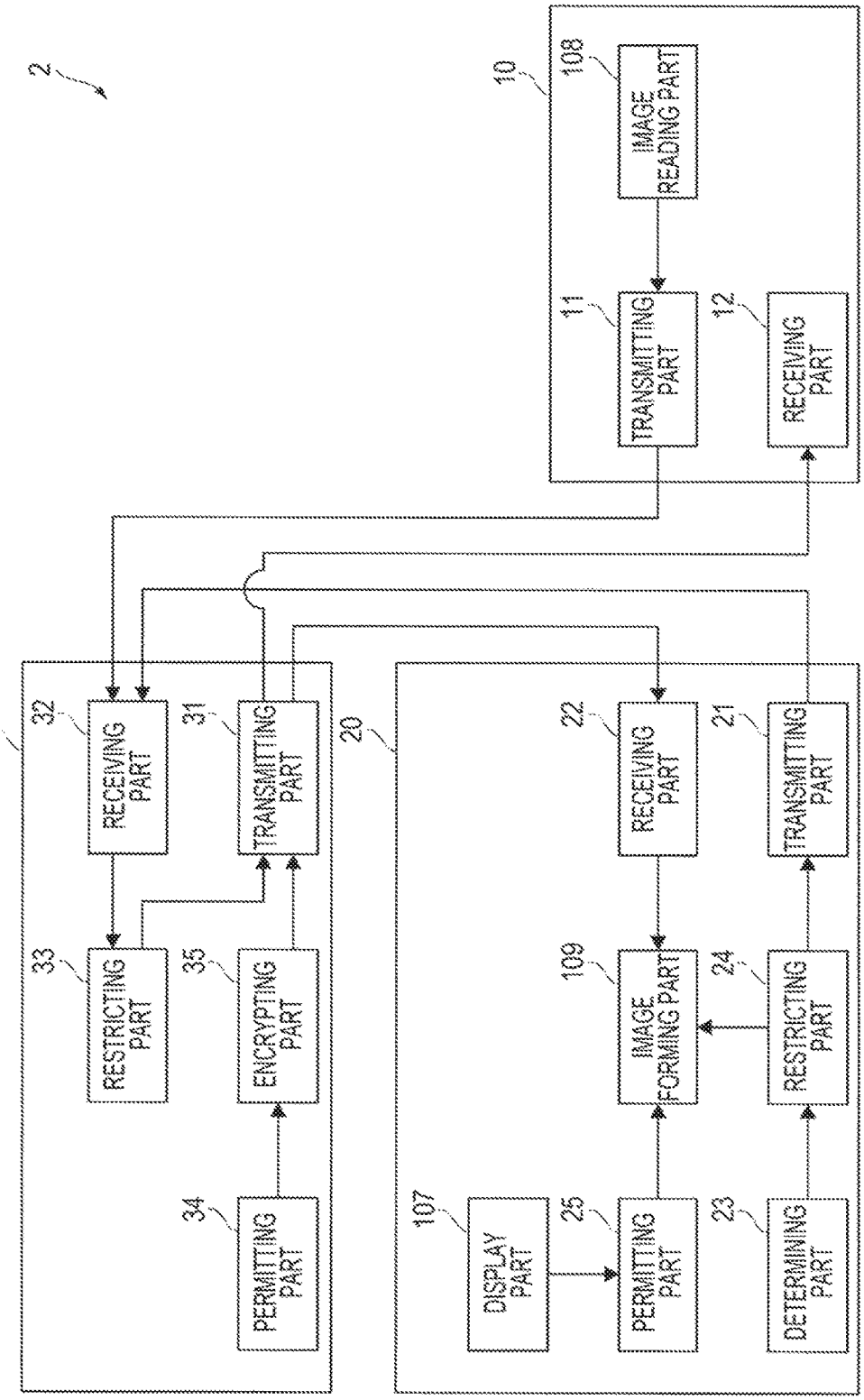
FIG. 11 is a block diagram illustrating the functional configuration of a system according to a second exemplary embodiment.

FIG. 11 is a block diagram illustrating the functional configuration of the system 2 according to the second exemplary embodiment.

The second image forming apparatus 20 of the second exemplary embodiment includes a receiving part 22 as an example of a receiving unit that receives data, an image forming part 109 as an example of an image forming part that forms an image of data, and a restricting part 24 that restricts the image forming part 109 to form an image of the data received by the receiving part 22 if a predetermined security requirement is not satisfied.

Then, in the second image forming apparatus 20 of the second exemplary embodiment, if a determining part 23 determines that a security requirement is not satisfied, the restricting part 24 restricts the image forming part 109 to form an image of document data. However, even in the case where the determining part 23 determines that the security requirement is not satisfied, if a time period for outputting document data is specified, a confirmation is made with the document recipient as to whether the restriction may be removed within that time period, and a response thereto is obtained. If the response obtained from the document recipient indicates removal of the restriction, the second image forming apparatus 20 causes the image forming part 109 to form an image of the document data.

One way to confirm with the document recipient whether the output restriction may be removed within that time period is, for example, to display a screen for confirming whether to remove the output restriction on the display part 107. Thus, for example, the second image forming apparatus 20 determines that the restriction may be removed if a display button for permitting removal of the restriction is pressed, and determines that the restriction may not be removed if a display button for rejecting removal is pressed.

That is, the second image forming apparatus 20 of the second exemplary embodiment includes the display part 107 as an example of an obtaining unit that, if a time period for outputting document data is specified, confirms with a document recipient whether the restriction may be removed within that time period, and obtains a response thereto, and a permitting part 25 that permits the image forming part 109 to form an image if the response obtained from the document recipient indicates removal of the restriction.

The exemplary operation of the system 2 of the second exemplary embodiment may be regarded to be the same as the exemplary operation of the system 1 of the first exemplary embodiment, but without the operations in steps S517, and S520 to S524. Further, upon decrypting document data and executing a print job in the operations in steps S528 and S529, in the case where the security requirement is not satisfied, a confirmation is made with the document recipient as to whether restriction may be removed within a time period specified for outputting document data, and a response thereto is obtained. If the response obtained from the document recipient indicates removal of the restriction, the document data may be decrypted to execute a print job.

Note that the server apparatus 30 according to the second exemplary embodiment does not have to include the restricting part 33 or the permitting part 34.

In the system 2 of the second exemplary embodiment having the configuration described above, even when output (printing) is restricted because the second image forming apparatus 20 does not satisfy the predetermined security requirement, the output (printing) restriction is removed if a response indicating removal of the restriction is obtained from the document recipient. Accordingly, document data is output (printed) by the second image forming apparatus 20 not satisfying the security requirement. Since the output (printing) by the second image forming apparatus 20 is performed after obtaining permission from the document recipient, the document recipient is prevented from unexpectedly suffering from disadvantages. In the case where the recipient wishes to quickly receive a document because, for example, the document needs to be received within a predetermined time period, the recipient may prioritize obtaining the document quickly over security. In other words, the document recipient may avoid a situation in which the document recipient cannot receive a document that the document recipient wishes to receive quickly because the security requirement is not satisfied.

In the system 1 and the system 2 described above, a terminal apparatus that receives information input by the user (for example, a document sender) and outputs information to the user may be provided in place of the first image forming apparatus 10. FIG. 3 may be regarded as a block diagram illustrating the hardware configuration of the terminal apparatus. That is, the terminal apparatus may include the CPU 301, the main memory 302, the HDD 303, the communication interface 304, the display mechanism 305, and the input device 306.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system comprising:
    a data transmission apparatus that transmits data;
    an output apparatus that outputs the data;
    a restricting unit that restricts output of the data when the output apparatus does not satisfy a predetermined security requirement;
    a time designating unit that designates a time when the data can be outputted; and
    a display unit that displays a releasing component that is configured to allow for the release of the output restriction of the restricting unit in a case where outputting the data is restricted by the restricting unit within the time when the data can be outputted,
    wherein when release of the output restriction occurs, the transmission apparatus encrypts the data to be transmitted to the output apparatus, the encryption occurring by use of a public key, and outputs the data using the transmitted encrypted data.

2. The system according to claim 1, wherein if the data has not been output within the time period, a notice indicating that the data has not been output is made to a sender of the data.

3. The system according to claim 1, wherein if the output apparatus is installed in a public space, the security requirement is determined not to be satisfied.

4. The system according to claim 1, wherein the transmission apparatus includes:
    an obtaining unit that obtains a response from the recipient; and
    a permitting unit that permits the output apparatus to output the data if the response obtained from the recipient indicates removal of the restriction.

5. The system according to claim 1, wherein the output apparatus includes:
    an obtaining unit that confirms with the recipient and obtains a response from the recipient; and
    an image forming unit that forms an image of the data if the response obtained from the recipient indicates removal of the restriction.

6. A processing apparatus comprising:
    a data transmitting unit that transmits data;
    a restricting unit that restricts output of the data if an output apparatus that outputs the data transmitted from the transmitting unit does not satisfy a predetermined security requirement;
    a time designating unit that designates a time when the data can be outputted; and
    a display unit that displays a releasing component that is configured to allow for the release of the output restriction of the restricting unit in a case where outputting the data is restricted by the restricting unit within the time when the data can be outputted;
    an obtaining unit that confirms with a recipient as to whether to allow for the release of the restriction within the time when the data can be outputted, and obtains a response, via the releasing component, from the recipient thereto; and
    a permitting unit that permits the output apparatus to output the data if the response obtained from the recipient indicates removal of the restriction,
    wherein when release of the output restriction occurs, the processing apparatus encrypts the data to be transmitted to the output apparatus, the encryption occurring by use of a public key, and outputs the data using the transmitted encrypted data.

7. An image forming apparatus comprising:
a data receiving unit that transmits data;
an image forming unit that forms an image of the data;
a restricting unit that restricts output of the data when the output apparatus does not satisfy a predetermined security requirement;
a time designating unit that designates a time when the data can be outputted;
a display unit that displays a releasing component that is configured to allow for the release of the output restriction of the restricting unit in a case where outputting the data is restricted by the restricting unit within the time when the data can be outputted; and
a permitting unit that permits the image forming unit to form an image if the output restriction of the restricting unit is released,
wherein when release of the output restriction is indicated, the image forming apparatus encrypts the data to be transmitted to the output apparatus, the encryption occurring by use of a public key, and outputs the data using the transmitted encrypted data.

* * * * *